US010825029B2

(12) United States Patent
Oden et al.

(10) Patent No.: US 10,825,029 B2
(45) Date of Patent: Nov. 3, 2020

(54) SUBSCRIPTION APPARATUS AND METHOD

(75) Inventors: William R. Oden, Tulsa, OK (US); Matthew D. Galloway, Tulsa, OK (US); Monica A. Murray, Tulsa, OK (US); Daniel Nelson, Tulsa, OK (US); Joseph Baumgartner, Tulsa, OK (US)

(73) Assignee: Refinitiv US Organization LLC, New York, NY (US)

( * ) Notice: Subject to any disclaimer, the term of this patent is extended or adjusted under 35 U.S.C. 154(b) by 1708 days.

(21) Appl. No.: 11/517,336

(22) Filed: Sep. 8, 2006

(65) Prior Publication Data

US 2007/0061366 A1 Mar. 15, 2007

Related U.S. Application Data

(63) Continuation-in-part of application No. 11/245,240, filed on Oct. 7, 2005.

(60) Provisional application No. 60/715,132, filed on Sep. 9, 2005.

(51) Int. Cl.
*G06Q 10/02* (2012.01)
*G06Q 30/02* (2012.01)

(52) U.S. Cl.
CPC .................................. *G06Q 30/02* (2013.01)

(58) Field of Classification Search
CPC ............................................... G06F 17/30011
USPC ........................................................ 707/736
See application file for complete search history.

(56) References Cited

U.S. PATENT DOCUMENTS

| | | | | |
|---|---|---|---|---|
| 5,428,606 A | * | 6/1995 | Moskowitz | 370/400 |
| 5,768,528 A | * | 6/1998 | Stumm | 709/231 |
| 5,790,935 A | * | 8/1998 | Payton | H04N 7/17336 |
| | | | | 348/E7.073 |
| 5,826,239 A | | 10/1998 | Du et al. | |
| 5,991,733 A | | 11/1999 | Aleia et al. | |
| 6,112,181 A | * | 8/2000 | Shear et al. | 705/7.29 |
| 6,154,781 A | * | 11/2000 | Bolam et al. | 709/238 |

(Continued)

FOREIGN PATENT DOCUMENTS

WO  WO 3043286 A2 *  5/2003  ............. H04L 29/06

OTHER PUBLICATIONS

LexisNexis PCLaw User Guide Version 7.5 (2005). LexisNexis Practice Management Systems. 1-685.*

(Continued)

*Primary Examiner* — Susanna M. Diaz

(74) *Attorney, Agent, or Firm* — Norton Rose Fulbright US LLP

(57) ABSTRACT

The present invention relates to a web-based software application, in which a server at a publisher compiles a predetermined list of items, such as regulatory, contract, budgeting, and legal issues, and stores them for periodic download to a client. The client would subscribe to the publisher, to receive information on a predetermined set of items. Periodically the server will scan its database and according to the client subscription, will retrieve and forward the predetermined items desired, to the client. The forwarded items will be compiled by the client and presented to the user in an easily viewable and searchable format. The user may choose a particular item to review, and then, if the user determines the item to be a relevant one, the user may transfer the item information to a monitoring software application for future monitoring and/or internal implementation as an issue.

28 Claims, 12 Drawing Sheets

(56) References Cited

U.S. PATENT DOCUMENTS

| | | | |
|---|---|---|---|
| 6,161,113 A | 12/2000 | Mora et al. | |
| 6,192,407 B1* | 2/2001 | Smith et al. | 709/229 |
| 6,236,991 B1* | 5/2001 | Frauenhofer et al. | 707/709 |
| 6,243,757 B1* | 6/2001 | Kanodia et al. | 709/235 |
| 6,385,655 B1* | 5/2002 | Smith et al. | 709/232 |
| 6,430,538 B1 | 8/2002 | Bacon et al. | |
| 6,460,036 B1* | 10/2002 | Herz | G06F 17/30867 348/E7.056 |
| 6,487,599 B1* | 11/2002 | Smith et al. | 709/229 |
| 6,501,421 B1* | 12/2002 | Dutta | G06F 16/9537 342/357.22 |
| 6,594,682 B2* | 7/2003 | Peterson et al. | 718/102 |
| 6,606,744 B1 | 8/2003 | Mikurak | |
| 6,636,822 B2 | 10/2003 | Englander | |
| 6,636,886 B1* | 10/2003 | Katiyar et al. | 709/203 |
| 6,643,682 B1* | 11/2003 | Todd et al. | 709/202 |
| 6,694,316 B1* | 2/2004 | Langseth | H04L 29/06 |
| 6,701,316 B1* | 3/2004 | Li | G06F 16/9574 370/395.41 |
| 6,718,369 B1* | 4/2004 | Dutta | 709/206 |
| 6,874,011 B1* | 3/2005 | Spielman et al. | 709/206 |
| 6,912,502 B1 | 6/2005 | Buddle et al. | |
| 6,944,658 B1* | 9/2005 | Schneider | 709/224 |
| 6,976,010 B2* | 12/2005 | Banerjee et al. | 705/51 |
| 7,028,082 B1* | 4/2006 | Rosenberg et al. | 709/223 |
| 7,051,073 B1* | 5/2006 | Dutta | 709/206 |
| 7,168,045 B2 | 1/2007 | Fliess et al. | |
| 7,177,859 B2* | 2/2007 | Pather et al. | |
| 7,213,005 B2* | 5/2007 | Mourad et al. | 705/64 |
| 7,236,966 B1 | 6/2007 | Jackson et al. | |
| 7,266,826 B2* | 9/2007 | Katiyar et al. | 719/316 |
| 7,305,392 B1 | 12/2007 | Abrams et al. | |
| 7,349,980 B1* | 3/2008 | Darugar et al. | 709/238 |
| 7,364,067 B2 | 4/2008 | Steusloff et al. | |
| 7,403,948 B2 | 7/2008 | Ghoneimy et al. | |
| 7,433,876 B2* | 10/2008 | Spivack et al. | |
| 7,437,375 B2* | 10/2008 | Borthakur et al. | |
| 7,519,546 B2* | 4/2009 | Murren et al. | 705/26.61 |
| 7,529,712 B2* | 5/2009 | Heaven et al. | 705/51 |
| 7,587,450 B2* | 9/2009 | Morris | 709/203 |
| 7,587,504 B2* | 9/2009 | Adams et al. | 709/229 |
| 7,590,866 B2* | 9/2009 | Hurtado et al. | 713/189 |
| 7,599,844 B2* | 10/2009 | King et al. | 705/1.1 |
| 7,640,184 B1* | 12/2009 | Lunt | G06Q 30/02 709/217 |
| 7,680,855 B2* | 3/2010 | Hyder et al. | 707/710 |
| 7,685,247 B2* | 3/2010 | Codignotto | 709/206 |
| 7,685,265 B1* | 3/2010 | Nguyen et al. | 709/223 |
| 7,698,151 B2* | 4/2010 | Gozzo et al. | 705/1.1 |
| 7,779,097 B2* | 8/2010 | Lamkin et al. | 709/223 |
| 7,788,403 B2* | 8/2010 | Darugar et al. | 709/238 |
| 7,886,180 B2* | 2/2011 | Jin et al. | 714/2 |
| 7,941,431 B2* | 5/2011 | Bluhm et al. | 707/736 |
| 2001/0047276 A1* | 11/2001 | Eisenhart | G06Q 10/10 705/37 |
| 2001/0049721 A1* | 12/2001 | Blair et al. | 709/203 |
| 2001/0056354 A1* | 12/2001 | Feit et al. | 705/1 |
| 2002/0049621 A1 | 4/2002 | Bruce | |
| 2002/0055849 A1 | 5/2002 | Georgakopoulos et al. | |
| 2002/0095399 A1* | 7/2002 | Devine | G06F 16/958 |
| 2002/0178119 A1 | 11/2002 | Griffin et al. | |
| 2002/0194014 A1 | 12/2002 | Starnes et al. | |
| 2003/0004880 A1* | 1/2003 | Banerjee et al. | 705/51 |
| 2003/0018510 A1 | 1/2003 | Sanches | |
| 2003/0023675 A1 | 1/2003 | Ouchi et al. | |
| 2003/0061225 A1 | 3/2003 | Bowman et al. | |
| 2003/0069894 A1 | 4/2003 | Cotter et al. | |
| 2003/0083891 A1 | 5/2003 | Lang et al. | |
| 2003/0120559 A1* | 6/2003 | Don | 705/26 |
| 2003/0126136 A1* | 7/2003 | Omoigui | 707/10 |
| 2003/0135556 A1* | 7/2003 | Holdsworth | 709/206 |
| 2003/0149578 A1 | 8/2003 | Wong | |
| 2003/0233372 A1* | 12/2003 | Warner | G06F 17/3089 |
| 2004/0002958 A1* | 1/2004 | Seshadri et al. | 707/3 |
| 2004/0010425 A1 | 1/2004 | Wilkes et al. | |
| 2004/0019645 A1* | 1/2004 | Goodman | G06Q 10/107 709/206 |
| 2004/0061716 A1* | 4/2004 | Cheung | G06F 9/542 715/710 |
| 2004/0093323 A1* | 5/2004 | Bluhm | G06F 16/9535 |
| 2004/0122906 A1* | 6/2004 | Goodman et al. | 709/206 |
| 2004/0138925 A1 | 7/2004 | Zheng | |
| 2004/0153453 A1* | 8/2004 | Brodie et al. | 707/10 |
| 2005/0033657 A1* | 2/2005 | Herrington et al. | 705/26 |
| 2005/0039136 A1* | 2/2005 | Othmer | 715/774 |
| 2005/0069847 A1* | 3/2005 | Carter | 434/169 |
| 2005/0091269 A1 | 4/2005 | Gerber et al. | |
| 2005/0114829 A1 | 5/2005 | Robin et al. | |
| 2005/0138063 A1* | 6/2005 | Bazot | G06F 16/9535 |
| 2005/0216555 A1* | 9/2005 | English et al. | 709/204 |
| 2005/0267896 A1* | 12/2005 | Goodman et al. | 707/10 |
| 2005/0267973 A1* | 12/2005 | Carlson | G06Q 30/06 709/228 |
| 2005/0273499 A1* | 12/2005 | Goodman et al. | 709/206 |
| 2006/0041593 A1* | 2/2006 | Borthakur et al. | 707/200 |
| 2006/0085238 A1 | 4/2006 | Oden et al. | |
| 2006/0117035 A1* | 6/2006 | Stewart et al. | 707/100 |
| 2006/0175399 A1 | 8/2006 | Steusloff et al. | |
| 2006/0178913 A1 | 8/2006 | Lara et al. | |
| 2006/0212698 A1* | 9/2006 | Peckover | 713/151 |
| 2006/0253455 A1* | 11/2006 | Potra | G06F 16/93 |
| 2006/0294077 A1* | 12/2006 | Bluhm et al. | 707/3 |
| 2007/0011067 A1* | 1/2007 | Seelos et al. | 705/35 |
| 2007/0061366 A1 | 3/2007 | Oden et al. | |
| 2007/0061487 A1* | 3/2007 | Moore et al. | 709/246 |
| 2007/0094661 A1* | 4/2007 | Baird | G06Q 10/06 718/102 |
| 2007/0143502 A1* | 6/2007 | Garcia-Martin et al. | 709/246 |
| 2008/0086573 A1* | 4/2008 | Martinez et al. | 709/242 |
| 2008/0086684 A1 | 4/2008 | Hertel et al. | |
| 2008/0162570 A1* | 7/2008 | Kindig et al. | 707/104.1 |
| 2008/0294794 A1* | 11/2008 | Darugar et al. | 709/238 |
| 2008/0306959 A1* | 12/2008 | Spivack et al. | 707/9 |
| 2010/0042441 A1 | 2/2010 | Steusloff et al. | |

OTHER PUBLICATIONS

What to Look for in Case Management Software (2004). The McNeill Group. 1-16.*

Staudt RW (2003). Perspectives on Knowledge Management in Law Firms. LexisNexis. 1-13.*

Pohmolka V (2001). The 2001 Lawyers Software Guide. National, Aug./Sep. 1-16.*

Time Matters 5.0 Brochure (2003). LexisNexis. 1-4.*

Time Matters 5.0 Practice Management Software (2004). Department of Clinical Legal Studies. USC School of Law. 1-15.*

Umar A (2005). IT Infrastructure to Enable Next Generation Enterprises. Information Systems Frontiers. 7(3): 217-256.*

Cameron B, Bilinsky D and Pinnington D (2004). Time Matters vs. Amicus Attorney. Technology for Lawyers. 1-97.*

LexisNexis Courtlink Step-By-Step Guide Mar. 17, 2005. pp. 1-30.*

* cited by examiner

| Subscriptions Issues Utilities Preferences Reports Help |
| Logged in as John Smith in group Production Feed (Logout) |

Items

301         Print (?)

Filter     Show Filter Settings | Add New Filter (?)

My Filters: [None Selected:  ▼]     [Filter] [Reset]

Search: [                              ]

▶Channels  ▶Topics  ▶Jurisdictions  ▶Dispositions  ▶Dates    Read Status   Priority
                                                                                                               [Unspecified ▼] [any ▼]

302

[Mark Selected As] [Of Interest ▼] [Mark All As] [Of Interest ▼]

Items (1661)     Save Sort As Default | Restore Default Sort (?)

Page [1] of 111 Go
First | Prev. | Next | Last

| ☐ ✓ ◥ U ⓘ | Headlines | Jurisdictions | Publish ▼ |
|---|---|---|---|
| ☐ ◥ | ⓘ HB 109–Coverage for Newborn and Infant Hearing Screening | Alaska | 8/22/2006 |
| ☐ ◥ | ⓘ Bulletin 1096–Surplus Lines | California | 8/22/2006 |
| ☐ ◥ | ⓘ Bulletin 1095–Surplus Lines | California | 8/22/2006 |
| ☐ ◥ | ⓘ Bulletin B-0031-06–Title Insurance E-Filing Fees | Texas | 8/22/2006 |
| ☐ ◥ | ⓘ Bulletin B-0032-06–Data Call | Texas | 8/22/2006 |
| ☐ ◥ | ⓘ Bulletin B-0030-06–Federal Violent Crime Control Act | Texas | 8/22/2006 |
| ☐ ◥ | ⓘ 114-78-1 et seq.–Individual Limited Health Benefits Plans | West Virginia | 8/22/2006 |
| ☐ ◥ | ⓘ Advisory Opinion 2006-09–Electronic Signatures | Kentucky | 8/22/2006 |
| ☐ ◥ | ⓘ 10 CCR 2190.20 et seq.–Agent Appointment and Termination | California | 8/22/2006 |
| ☐ ◥ | ⓘ Regulation 171–Healthy New York Program | New York | 8/22/2006 |
| ☐ ◥ | ⓘ SB 8417–Processing of Health Claims and Provider Credentialing | New York | 8/22/2006 |
| ☐ ◥ | ⓘ AB 11129–Financial Requirements | New York | 8/22/2006 |
| ☐ ◥ | ⓘ AB 699–Health Insurance Coverage | New York | 8/22/2006 |
| ☐ ◥ | ⓘ 10 CCR 2697.6–Earthquake Policies | California | 8/21/2006 |
| ☐ ◥ | ⓘ 28 TAC 5.4607–Inspections for Windstorm and Hail Insurance | Texas | 8/21/2006 |

Page [1] of 111 Go
First | Prev. | Next | Last

FIG. 5

Subscriptions  Issues  Utilities  Preferences  Reports  Help

Logged on as John Smith in group Production Feed (Logout)

FAC 69B-231.010 et seq.- Penalty Guidelines for Insurance Repres...

| Details | Attachments [1] | Notes [0] | Item History [0] | Related Issues [0] |

Save Changes | Save and Return | Return to Item List                      Highlight | Print ?

I want to

Disposition this Item

Add a Note

Create an Issue from this Item

Headline
FAC 69B-231.010 et seq.-Penalty Guidelines for Insurance Representatives

Citation
FAC 69B-231.010 et seq.

Status
Disposition ✓ [Not Reviewed ▼]
Priority ✓ [Normal ▼]

Important Dates
Enacted Date [N/A]
Effective Date [8/15/2006]
Publish Date [8/23/2006 3:31:34 PM]

Description
Revises the regulation pertaining to penalty guidelines for insurance representatives. Makes technical changes and updates references. Supplements definition of "crimes involving moral turpitude." Revises terms as to the Department's discretion in regard to a final penalty. Stipulates that the provisions are not intended to limit the Department's ability to informally dispose of actions. Revises and supplements penalty provisions for specified violations. Removes provisions regarding foreign law enforcement records at .150. (This regulation will be summarized in the SR&R LICENSING REQUIREMENTS topics.)

Classification Data

Jurisdictions  [Florida]

Topics  [Producer Conduct, Producer Licensing, Regulation]

Channels  [Capitol Action DI, Capitol Action Health, Capitol Action L&A, Capitol Action LTC, Capitol Action P&C]

Publisher  [Insurance Services, Inc.]

Subscriptions   Issues   Utilities   Preferences   Reports   Help

Logged on as John Smith in group Production Feed (Logout)

IDAPA 18.01.73 - The Individual Health Insurance Availability Act

| Details | Attachments [1] | Notes [0] | Item History [0] | Related Issues [0] |

Save Changes | Save and Return | Return to Item List          Highlight | Print ?

| I want to | Attachments (1) | | | |
|---|---|---|---|---|
| Disposition this Item | Attachments Name | File Name | File Type | Size |
| Add a Note | IDAPA 18.01.73-11/10/2005-Adopted Pending Rule | IDAPA 18.01.73.html | TEXT/HTML | 24k |
| Create an Issue from this Item | | | | |

FIG. 7

Subscriptions   Issues   Utilities   Preferences   Reports   Help

Logged on as John Smith in group Production Feed (Logout)

IDAPA 18.01.73 - The Individual Health Insurance Availability Act

| Details | Attachments [1] | Notes [1] | Item History [0] | Related Issues [0] |

Save Changes | Save and Return | Return to Item List          Highlight | Print ?

| I want to | Notes (1) | | |
|---|---|---|---|
| Disposition this Item | Added ▲ | Author | Note |
| Add a Note | 1/19/2006 12:20:08 AM | John Smith | This bill will affect our internal policies and procedures. Edit | Delete We should create an issue and track it within to make sure we make the necessary changes. Modified last by John Smith at 1/19/2006 10:20:03 AM |
| Create an Issue from this Item | | | |

FIG. 8

Subscriptions  Issues  Utilities  Preferences  Reports  Help

Logged on as John Smith in group Production Feed (Logout)

Preview: 2006 MD S 30 - State Employee Teleworking

| Details | Attachments [1] | Notes [0] | Item History [2] | Related Issues [0] |

Save Changes | Save and Return | Return to Item List                    Highlight | Print  ⓘ

I want to

Disposition this Item

Add a Note

Create an Issue from this Item

Item History (2)

| Headline ▼ | Effective | Publish |
|---|---|---|
| ⓘ Preview: State Employee Teleworking | N/A | 1/10/2006 |
| ⓘ Preview: 2006 MD S 30-State Employee Teleworking | N/A | 1/12/2006 |

FIG. 9

Subscriptions  Issues  Utilities  Preferences  Reports  Help

Logged on as John Smith in group Production Feed (Logout)

Preview: 2006 MD S 30 - State Employee Teleworking

| Details | Attachments [1] | Notes [0] | Item History [2] | Related Issues [1] |

Save Changes | Save and Return | Return to Item List                    Highlight | Print  ⓘ

I want to

Disposition this Item

Add a Note

Create an Issue from this Item

Related Issues (1)

| Issue ▼ | Category | Compliance | Created | Issue Owner |
|---|---|---|---|---|
| 06-01018 ⓘ | E-Commerce and Information Systems Issues | 1/19/2006 | 1/19/2006 | N/A |

FIG. 10

```
28 TAC 3.3703 - PPO's and Provider Contracts
```

| Details | Attachments [1] | Notes [0] | Item History [0] | Related Issues [0] |

Save Changes | Save and Return | Return to Item List                   Highlight | Print ⓘ

| I want to | Disposition Item |
|---|---|
| Disposition this Item | The disposition indicates whether this item is of interest to you. Select the appropriate disposition and save your changes, or Cancel if you do not wish to change the disposition. |
| Add a Note | |
| Create an Issue from this Item | Disposition ✓ [Of Interest ▼] |
| | [ Cancel ] |

FIG. 11

| | Daily Email Notification |
|---|---| www.someplace.com   www.somewhere.com
Thursday, January 19, 2006

ACCOUNT INFORMATION
Email Address: *JohnSmith @ someplace.com*
Group Name: *Production Feed*
Account Login: *SmithJ*

SUMMARY DOCUMENT UPDATES
○ AB 773-Usolicited Telemarketing Calls (New Jersey)
○ 02-032-504 et al.-The Securities Act and Licensing Requirements (Maine)
○ Regulation 1214-Senior Suitability in Annuity Transactions (Delaware)
○ Emergency Rule 22-Mediation Program for Resedential Hurricane Claims (Louisiana)
○ Emergency Rule 23-Suspension of Right to Cancel or Nonrenew (Louisiana)
○ Bulletin No. 2006-01-DNS- Commercial Lines Filing Requirements for Terrorism Risk Extension Act (Michigan)

AB 773-Unsolicited Telemarketing Calls                                            Top
ADVERTISING, SALES AND MARKETING, TELEMARKETING-NEW JERSEY Citation: AB 773
Publication Channels: Capitol Action Health, Capitol Action L&A, Capitol Action LTC, Capitol Action P&C
Publication Date: 1/10/2006
Enacted Date: 1/9/2006
Effective Date: 7/1/2006

| Descriptions: |
|---|

Amends the rules pertaining to unsolicited telemarketing calls and adds prohibition against using technology as a means to misrepresent a telemarketer's identity (56:0-128). (This bill will be summarized in the SR&R TELEPHONE SOLICITATION topic).

Click here to access Subscription Application
http://18.10.16.8/someplace

FIG. 12

| | Subscriptions  Issues  Utilities  Preferences  Reports  Help |
|---|---|
| | Logged on as John Smith in group Production Feed (Logout) |

Create Issue

Return to Issue List                                                                                           Print  ⓘ

What's going on here?
Check the data elements that you would like to copy to the new issue that you are creating then select the "Create Issue" button. A new issue will be created from the data that you have selected. You can then edit the information for the new issue.   [Create Issue]

Issue Details

| Issue Type | ○ FYI Issue  ⦿ Standard Issue |
|---|---|
| ☑ Priority | Normal |
| ☐ Enacted Data | No Data Available |
| ☑ Effective Data | 2/16/2006 |
| ☑ Source | Insurance Services, Inc. |
| ☑ Citations | Directive 06-L&H-2 |
| ☑ Overview | Directive 06-L&H-2 – Foreign Travel and Rejection of Life Insurance Applications |
| ☑ Issue Details | Notifies all insurers that rejection of an application for life insurance based solely on past lawful foreign travel or future intent to engage in lawful foreign travel to any country is an unfair trade practice, as found in 33-6-4(b)(8)(A)(i), unless the rejection is based on sound principles that have been approved by the Department. This Directive replaces Directive 06-L&H-1 that was issued on 2/1/06. (This Directive will be summarized in SR&R ADVERTISING, SALES AND MARKETING topic). |
| ☑ Topics | Advertising, Sales and Marketing, Underwriting/Rating Requirements, Unfair Trade Practices |

Map Item Topics to Issue Categories                                                                        ⓘ

| Topic | Mapped to Category | Remember |
|---|---|---|
| Advertising, Sales and Marketing | [Advertising, Sales and Marketing ▼] | ☐ |
| Underwriting/Rating Requirements | [Add Category ▼]<br>[Underwriting/Rating Requirements] | ☐ |
| Unfair Trade Practices | [Add Category ▼]<br>[Unfair Trade Practices] | ☐ |

☑ Jurisdictions   Georgia

Map Item Jurisdictions to Issue Jurisdictions                                                             ⓘ

| Jurisdiction | Mapped to | Remember |
|---|---|---|
| Georgia | [Georgia ▼] | ☐ |

☑ Copy Attachments  ⬥ Attachments (1)                                                                      ⓘ

| Attachment Name | File Name | File Type | Size |
|---|---|---|---|
| Georgia Directive OS-L&H-2 | BGA60015.pdf | PDF | 96k |

Projects (0)                                                                                                       ⓘ
No Projects

FIG. 14

Subscriptions  Issues  Utilities  Preferences  Reports  Help
Logged on as John Smith in group Production Feed (Logout)

Edit Email Notification

Save and Return | Return to Email Notification List  ⓘ

| I want to | Email Notification Details | |
|---|---|---|
| Add an Email Notification | Daily | ☐ |
| | Weekly | ☑ |
| | Monthly | ☐ |
| | Channel | Capitol Preview-LTC ▼ |

Topics  ⓘ

| Topics | | Selected Values |
|---|---|---|
| 1035 Exchanges ▼<br>Accelerated Benefits<br>Accident-Only Insurance<br>Actuarial Opinions<br>Adjusters<br>Advertising, Sales and Market<br>Alternative Dispute Resolution<br>Annuities<br>Anti-Money Laundering ▲ | [Add=>]<br>[<=Remove]<br><br>[Select All]<br>[Select None]<br>[Invert] | All (no filter applied) |

Jurisdictions  ⓘ

| Jurisdictions | | Selected Values |
|---|---|---|
| Alabama ▼<br>Alaska<br>Arizona<br>Arkansas<br>California<br>Colorado<br>Delaware<br>District of Columbia<br>Florida ▲ | [Add=>]<br>[<=Remove]<br><br>[Select All]<br>[Select None]<br>[Invert] | All (no filter applied) |

| Created By | Created On | Modified By | Modified On |
|---|---|---|---|
| John Smith | 2/7/2006 8:35:42 AM | Not Available | Not Available |

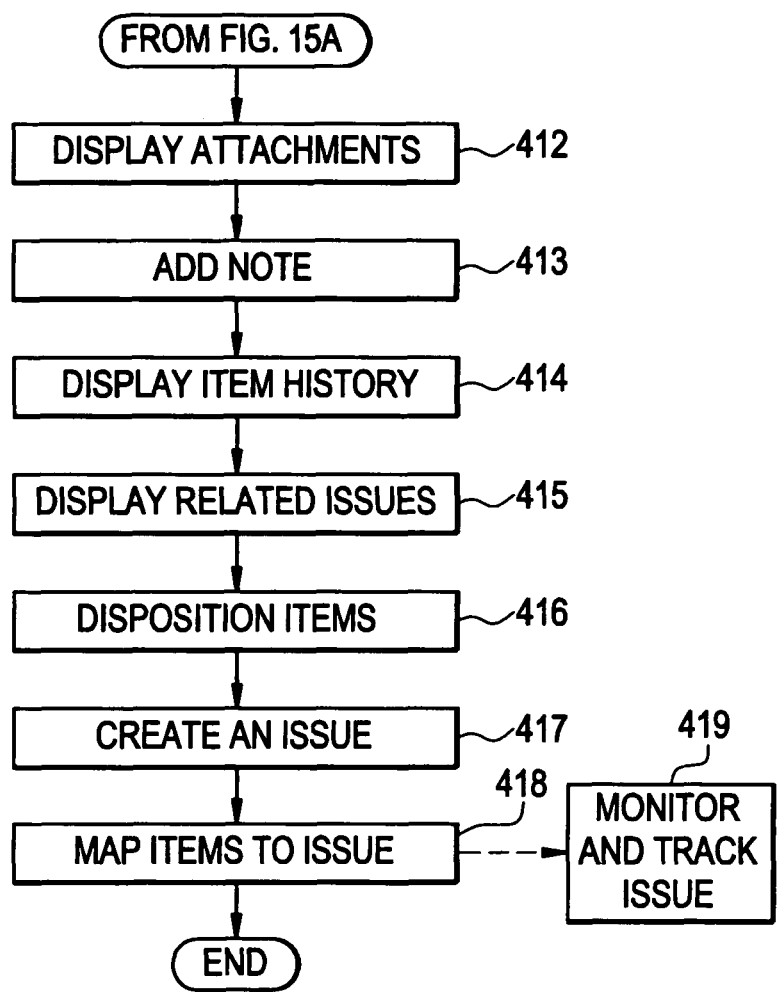

SUBSCRIPTION APPARATUS AND METHOD

CROSS-REFERENCE TO RELATED APPLICATIONS

The present application claims priority from U.S. Patent Provisional Application No. 60/715,132, filed Sep. 9, 2005, and is a continuation-in-part of U.S. patent application Ser. No. 11/245,240, filed Oct. 7, 2005, the contents of both applications which are herein incorporated by reference in their entirety.

BACKGROUND OF THE INVENTION

1. Field of the Invention

The present invention relates to a web-based application in which a server monitors websites or publisher's services, to scan and compile predetermined information or items for downloading to a client, for potential monitoring and tracking internally by the client.

2. Description of the Related Art

Monitoring regulatory, contract, budgeting, and legal issues, etc., on the internet is a time- and labor-intensive process. In particular, any items or issues that have been considered relevant to an organization have been monitored by using individuals assigned to such activities to look up the regulations, contracts, case law, calendar target or compliance dates, etc. on various internet databases, and then to forward this information, such as effective dates, enacted dates, citations, jurisdictions, descriptions, etc., to particular individuals for their review and selection of an issue for monitoring.

This labor and intensive process inherently has inaccuracies which could lead to missed target dates. Accordingly, a comprehensive, automated, and accurate way to locate items or issues that are of importance to a company from the vast number of issues in the public domain, and to compile information on these items or issues for review and selection by a company and for subsequent monitoring and tracking, is desired.

SUMMARY OF THE INVENTION

The present invention relates to a web-based software application, in which a server at a publisher's service, compiles a predetermined list of items, either manually or automatically, and stores them for periodic download to a client. The client would subscribe to the publisher's service, to receive information on a predetermined set of items. Periodically, at the client's request, the server will scan its database and according to the client subscription, will retrieve and forward the predetermined items desired, to the client. The forwarded items will be compiled by the client and presented to the user in an easily viewable and searchable format. The user may choose a particular item to review, and then, if the user determines the item to be a relevant one to the user's company, the user may transfer the item information to a monitoring software application for future monitoring and/or internal implementation of the item as an issue.

In one embodiment consistent with the present invention, a subscription method performed over a computerized network, includes: receiving predetermined information from a publisher; displaying the received information as a list of items on a display screen; displaying the information according to predetermined criteria; and dispositioning the items for future handling.

In one embodiment consistent with the present invention, the predetermined criteria includes filter settings of at least one of, items of interest, channel, topic, jurisdictions, dispositions, dates, keywords, read status, disposition, and priority. Further, the predetermined criteria may include sort settings of at least jurisdiction and publish date.

In one embodiment consistent with the present invention, the receiving step is via e-mail notification to a recipient. The e-mail notification can be edited to select predetermined parameters which modify the predetermined information sent in the e-mail notification.

In another embodiment consistent with the present invention, a database is scanned for said predetermined information which has been updated since a previous scan of said database, and said scanning is performed at predetermined intervals.

In yet another embodiment consistent with the present invention, the predetermined information is stored in at least one channel in the database. At least one item may be included in more than one channel.

In yet another embodiment consistent with the present invention, only updated predetermined information is forwarded to said recipient.

In yet another embodiment consistent with the present invention, an issue may be created for tracking and monitoring based on the dispositioning of the predetermined information.

In yet another embodiment consistent with the present invention, dispositioning of the items includes designating each item as one of Not of Interest, Of Interest, and Resolved.

In yet another embodiment consistent with the present invention, a method of compiling predetermined information in a subscription application over a computerized network, includes storing information on a plurality of predetermined information under one or more channels in a database; scanning the database periodically for updated information since a last scan of the database; and forwarding an e-mail notification to a recipient, when updated information is found.

In yet another embodiment consistent with the present invention, a computer system has a program which performs a subscription method over a computerized network, which includes means for receiving predetermined information from a publisher; means for displaying the received information as a list of items; means for displaying the information according to predetermined criteria; and means for dispositioning the items for future handling.

In yet another embodiment consistent with the present invention, the computer system includes means for scanning a database for said predetermined information which has been updated since a previous scan of said database, and/or means for creating an issue for tracking and monitoring based on the dispositioning of the predetermined information.

In yet another embodiment consistent with the present invention, a computer system has a program which performs a method of compiling predetermined information in a subscription application over a computerized network, which includes means for storing information on a plurality of predetermined information under one or more channels in a database; means for scanning the database periodically for updated information since a last scan of the database; and means for forwarding an e-mail notification to a recipient, when updated information is found.

In yet another embodiment consistent with the present invention, a computer system for performing a subscription method over a computerized network, includes at least one memory containing at least one program comprising the steps of: receiving predetermined information from a publisher; displaying the received information as a list of items on a display screen; displaying the information according to predetermined criteria; and dispositioning the items for future handling; and at least one processor for running the program.

In yet another embodiment consistent with the present invention, a computer system for performing a method of compiling predetermined information in a subscription application over a computerized network, includes at least one memory containing at least one program comprising the steps of: storing information on a plurality of predetermined information under one or more channels in a database; scanning the database periodically for updated information since a last scan of the database; and forwarding an e-mail notification to a recipient, when updated information is found; and at least one processor for running the program.

In yet another embodiment consistent with the present invention, a computer-readable medium whose contents cause a computer system to perform a subscription method over a computerized network, has a program comprising the steps of: receiving predetermined information from a publisher; displaying the received information as a list of items on a display screen; displaying the information according to predetermined criteria; and dispositioning the items for future handling.

In yet another embodiment consistent with the present invention, a computer-readable medium whose contents cause a computer system to perform a method of compiling predetermined information in a subscription application over a computerized network, has a program comprising the steps of: storing information on a plurality of predetermined information under one or more channels in a database; scanning the database periodically for updated information since a last scan of the database; and forwarding an e-mail notification to a recipient, when updated information is found.

In yet another embodiment consistent with the present invention, an apparatus for performing a subscription method over a computerized network, includes a storage device which stores information on a plurality of items; a subscription module which displays the plurality of items based on user-selected predetermined criteria, including sort and filter criteria, and which dispositions the items based on user preferences; and a display which displays the information on the items in a format such that a user can view details of the items according to user preferences.

In yet another embodiment consistent with the present invention, an apparatus for compiling predetermined information in a subscription application over a computerized network, includes a storage device which stores information on a plurality of items in a plurality of channels, wherein each of the items is stored in one or more of the channels; and means for scanning the storage device periodically for updated items since a last scan of said storage device; and means for forwarding an e-mail notification to a recipient, when updated items are located in the storage device.

In yet another embodiment consistent with the present invention, a method of generating a GUI screen for performing a subscription method, includes: displaying, on a screen, at least one item for dispositioning by a user, the items being displayed according to predetermined criteria; displaying, on a screen, at least one item for dispositioning by a user, the items being displayed according to predetermined criteria; wherein the predetermined criteria includes filter settings of at least one of, items of interest, channel, topic, jurisdictions, dispositions, dates, keywords, read status, disposition, and priority.

In yet another embodiment consistent with the present invention, a method of generating a GUI screen for performing a subscription method, includes: displaying, on a screen, at least one item for dispositioning by a user, the items being displayed according to predetermined criteria; wherein the predetermined criteria includes sort settings of at least one of jurisdiction and publish date.

In yet another embodiment consistent with the present invention, a computer system has a program which generates a GUI screen for performing a subscription method, including means for displaying, on a screen, at least one item for dispositioning by a user, the items being displayed according to predetermined criteria; wherein the predetermined criteria includes filter settings of at least one of, items of interest, channel, topic, jurisdictions, dispositions, dates, keywords, read status, disposition, and priority.

In yet another embodiment consistent with the present invention, a computer system has a program which generates a GUI screen for performing a subscription method, including means for displaying, on a screen, at least one item for dispositioning by a user, the items being displayed according to predetermined criteria; wherein the predetermined criteria includes sort settings of at least one of jurisdiction and publish date.

In yet another embodiment consistent with the present invention, a computer system for generating a GUI screen for performing a subscription method, including: at least one memory containing at least one program comprising the steps of: displaying, on a screen, at least one item for dispositioning by a user, the items being displayed according to predetermined criteria; wherein the predetermined criteria includes filter settings of at least one of, items of interest, channel, topic, jurisdictions, dispositions, dates, keywords, read status, disposition, and priority; and at least one processor for running the program.

In yet another embodiment consistent with the present invention, a computer system for generating a GUI screen for performing a subscription method, includes at least one memory containing at least one program comprising the steps of: displaying, on a screen, at least one item for dispositioning by a user, the items being displayed according to predetermined criteria; wherein the predetermined criteria includes sort settings of at least one of jurisdiction and publish date; and at least one processor for running the program.

In yet another embodiment consistent with the present invention, a computer-readable medium whose contents cause a computer system to generate a GUI screen for performing a subscription method, has a program comprising the steps of: displaying, on a screen, at least one item for dispositioning by a user, the items being displayed according to predetermined criteria; wherein the predetermined criteria includes filter settings of at least one of, items of interest, channel, topic, jurisdictions, dispositions, dates, keywords, read status, disposition, and priority.

In yet another embodiment consistent with the present invention, a computer-readable medium whose contents cause a computer system to generate a GUI screen for performing a subscription method, has a program comprising the steps of: displaying, on a screen, at least one item for dispositioning by a user, the items being displayed according to predetermined criteria; wherein the predetermined criteria includes sort settings of at least one of jurisdiction and publish date.

There has thus been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

FIG. 2 is a representative screen shot of and Items List Page according to one embodiment consistent with the present invention.

FIG. 5 is a representative screen shot of a Items Details tab according to one embodiment consistent with the present invention.

FIG. 6 is a representative screen shot of an Attachments page according to one embodiment consistent with the present invention.

FIG. 7 is a representative screen shot of a Notes page according to one embodiment consistent with the present invention.

FIG. 8 is a representative screen shot of an Item History page according to one embodiment consistent with the present invention.

FIG. 9 is a representative screen shot of a Related Issues page according to one embodiment consistent with the present invention.

FIG. 10 is a representative screen shot of a Disposition page according to one embodiment consistent with the present invention.

FIG. 11 is a representative screen shot of a Create Issue page according to one embodiment consistent with the present invention.

FIG. 12 is a representative screen shot of a Daily E-mail Notification page according to one embodiment consistent with the present invention.

FIG. 14 is a representative screen shot of an Edit E-mail Notification page according to one embodiment consistent with the present invention.

FIGS. 15A and 15B are a flow chart of an exemplary method of operation of a subscription application according to one embodiment consistent with the present invention.

DESCRIPTION OF THE INVENTION

The present invention relates to a web-based software application, in which a server at a publisher's service, compiles a predetermined list of items, either manually or automatically, and stores them for periodic download to a client. The server is designed to either have a user manually input items, such as regulatory, contract, budgeting, and legal issues, into a database; or, alternatively, the server receives automatic uploads from various organizations which send out their latest regulations, legislation, etc., over the internet, and the server receives these inputs and stores the uploads in the database.

The client would subscribe to the publisher's service, to receive information on a predetermined set of items. Thus, the server will have stored a wide variety of items, of which the predetermined set of items to which the client subscribes, is a subset. Accordingly, periodically, at the client's request, the server will scan its database and according to the client subscription, will retrieve and forward the predetermined items desired, to the client. The forwarded items will be compiled by the client and presented to the user in an easily viewable and searchable format. The user may choose a particular item to review, and then, if the user determines the item to be a relevant one to the user's company, the user may transfer the item information to a monitoring software application for future monitoring and/or internal implementation of the item as an issue.

System

Figure 1:
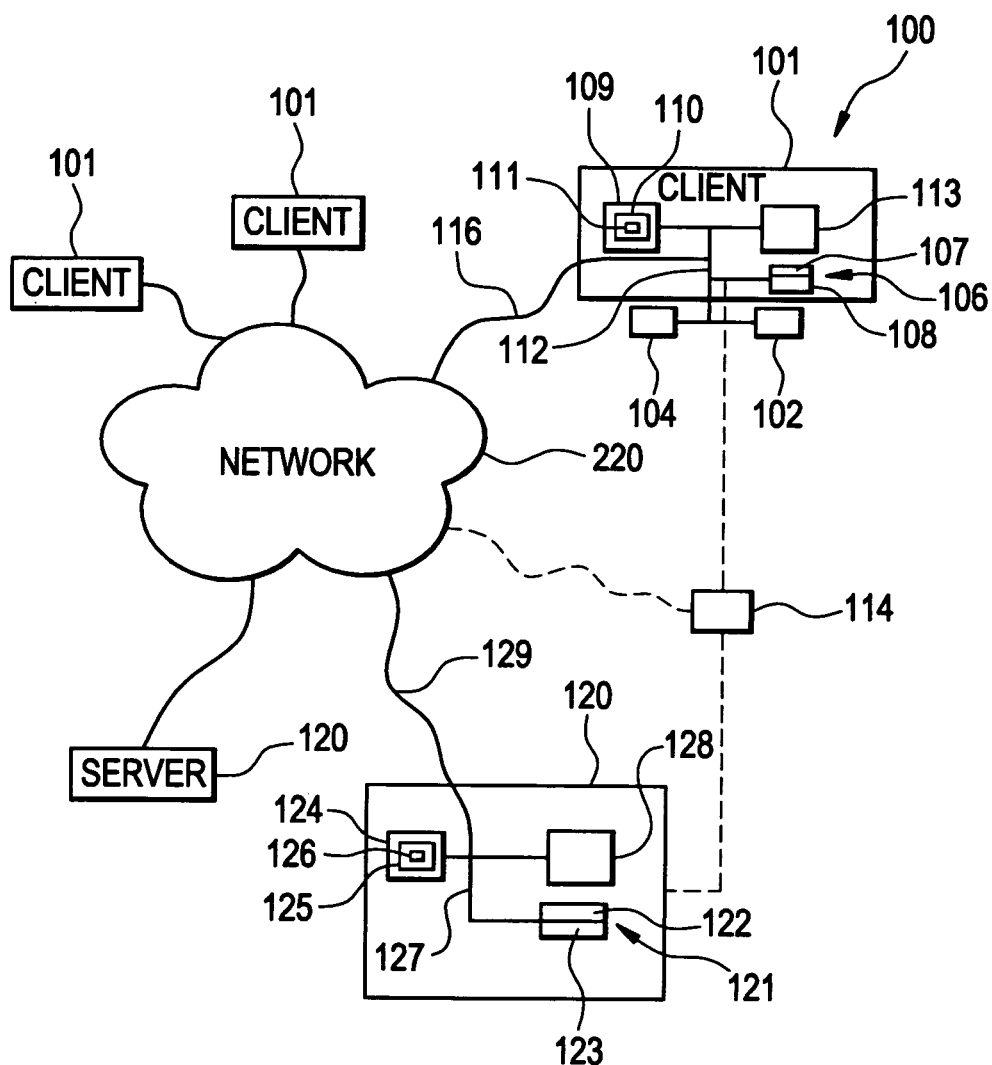
FIG. 1 is a schematic of one embodiment consistent with the present invention, showing a client-server environment and connection via the Internet.

In one embodiment consistent with the present invention, the system 100 (see FIG. 1) includes a client computer 101, such as a personal computer (PC), with display or monitor 102 and input means 104. However, the client 101 may be a mobile terminal, such as a mobile computing device, or a mobile data organizer (PDA), operated by the user accessing the program remotely from the client 101.

Methods and systems consistent with the present invention are carried out by providing an input means 104, or user selection means, including hot clickable icons etc., or selection buttons, in a menu, dialog box, or a roll-down window of an interface provided at the client 101, and the user may input commands through a programmable stylus, keyboard, mouse, speech processing means, laser pointer, touch screen, or other input means 104.

The input or selection means 104 may be constituted by a dedicated piece of hardware or its functions may be executed by code instructions executed on the client processor 106, involving the display unit 102 for displaying the selection window and a stylus or keyboard for entering a selection, for example.

The client 101 typically includes a processor 106 as a client data processing means, the processor including a central processing unit (CPU) 107 or parallel processor and an input/output (I/O) interface 108, a memory 109 with a program 110 having a data structure 111, all connected by a bus 112. Further, as stated above, the client 101 would include an input device or means 104, a display 102, and may also include one or more secondary storage devices 113. The bus 112 may be internal to the client 101 and may include an adapter to a keyboard or input device 104 or may include external connections.

The imaging display device 102 for the present invention is a high resolution computer monitor, which could also be a touch screen monitor. Alternatively, the display device 102 can also include other devices such as a tablet, pocket PC, and plasma screen. The touch screen may be pressure sensitive and responsive to the input of a stylus 104, for example, which would be used to directly interact with the display device 102.

Note that with respect to the client system 101, the graphics user interface (GUI) is a client application written to run on existing computer operating systems which may be ported to other personal computer (PC) software, personal digital assistants (PDAs), and cell phones, and any other digital device that has a screen or visual component and appropriate storage capability.

The processor 106 at the client 101 may be internal or external thereto, and executes a program 110 adapted to predetermined operations. The processor 106 has access to the memory 109 in which may be stored at least one sequence of code instructions comprising the program 110 and the data structure 111 for performing predetermined operations. The memory 109 and program 110 may be located within the client 101 or external thereto.

Note that at times the system of the present invention is described as performing a certain function. However, one of ordinary skill in the art would know that the program 110 is what is performing the function rather than the entity of the system itself.

The program 110 which runs the method and system of the present invention may include a separate program code for performing a desired operation, or may be a plurality of modules performing sub-operations of an operation, or may be part of a single module of a larger program 110 providing the operation. For example, the program 110 or a portion thereof, can be defined as a subscription module.

The processor 106 may be adapted to access and/or execute a plurality of programs 110 corresponding to a plurality of operations. An operation rendered by the program 110 may be, for example, supporting the user interface, performing e-mail applications, etc.

The data structure 111 may include a plurality of entries, each entry including at least a first storage area that stores the databases or libraries of scanned files, for example. The data structure can also have alternative embodiments including those associated with the stored information as one of ordinary skill in the art would appreciate from the following descriptions.

The storage device 113 stores at least one data file, such as image files, text files, data files, audio, video files, etc., in providing a particular operation. The data storage device as storage means 113, may for example, be a database, including a distributed database connected via a network, for example. The database can be a computer searchable database and may be a relational database. The storage device may be connected to the server 120 and/or the client 101, either directly or through a communication network, such as a LAN or WAN. An internal storage device 113, or an external storage device 114 is optional, and data may also be received via a network and directly processed.

In methods and system consistent with the present invention, the client 101 may be connected to other clients 101 or servers 120, including administration, billing or other systems, via a communication link 116 as a client communication means, using a communication end port specified by an address or a port, and the communication link 116 may include a mobile communication link, a switched circuit communication link, or may involve a network of data processing devices such as a LAN, WAN, the Internet, or combinations thereof. In particular, the communication link may be to e-mail systems, fax, telephone, wireless communications systems such as pagers and cell phones, wireless PDA's and other communication systems.

The communication link 116 may be an adapter unit capable to execute various communications protocols in order to establish and maintain communication with the server 120, for example. The communication link 116 may be constituted by a specialized piece of hardware or may be realized by a general CPU executing corresponding program instructions. The communication link 116 may be at least partially included in the processor 106 executing corresponding program instructions.

In one embodiment consistent with the present invention, if a server 120 is used in a non-distributed environment, the server 120 would include a processor 121 having a CPU 122 or parallel processor which is a server data processing means, and an I/O interface 123, but may also be constituted by a distributed CPU 122 including a plurality of individual processors 121 on one or a plurality of machines. The processor 121 of the server 120 may be a general data processing unit, but preferably a data processing unit with large resources (i.e., high processing capabilities and a large memory for storing large amounts of data).

The server 120 may include a memory 124 with program 125 having a data structure 126 all connected by a bus 127. The bus 127 or similar connection line can also consist of external connections, if the server 120 is constituted by a distributed system. The server processor 121 may have access to a storage device 128 for storing preferably large numbers of programs for providing various operations to the users.

The data structure 126 may include a plurality of entries, each entry including at least a first storage area which stores data and image files, for example, but may also have alternative embodiments including that associated with other stored information as one of ordinary skill in the art would appreciate.

The server 120 may be a single unit or may be a distributed system of a plurality of servers 120 or data processing units, and may be shared by multiple users in direct or indirect connection to each other. The server 120 performs at least one server program for a desired operation, which is required in serving a request from the client 101.

The communication link 129 from the server 120 is preferably adapted to communicate with a plurality of clients.

The present invention is implemented in software which can be provided in a client and server environment or in a distributed system over a computerized network across a number of client systems. Thus, in the present invention, a particular operation may be performed either at the client or the server, at the edge of a network or at the center, or both. Therefore, at either the client or the server, or both, corresponding programs for a desired operation/service are available.

In a client-server environment, at least one client and at least one server are each connected to a network 220 such as a Local Area Network (LAN), Wide Area Network (WAN), and/or the Internet, over a communication link 116, 129. Interaction with users may be through secure and non-secure internet connectivity. Thus, the steps in the methods consistent with the present invention are carried out at the client 101 or at the server 120, or at both, the server (if used) being accessible by the client over for example, the Internet using a browser application or the like.

The client system 101 may include communications via a wireless service connection. The server system 120 may include communications with network/security features, via a wireless server, which connects to, for example, voice recognition. However, one of ordinary skill in the art would know that other systems may be included.

In another embodiment consistent with the present invention, the client system 101 may be a basic system, and the server 120 may include all of the components necessary to support the software platform of the present invention. Further, the present client-server system may be arranged such that the client system 101 can operate independently of the server system 120, but that the server system 120 can be optionally connected. In the former situation, additional modules would instead be connected to the client system 101. In another embodiment consistent with the present invention, the client system 101 and server system 120 can be disposed in one system, rather being separated into two systems.

Although the above physical architecture has been described above as client-side or server-side components, one of ordinary skill in the art would know that the above components of the physical architecture may be in either client or server, or in a distributed environment.

Further, although the above-described features and processing operations may be realized by dedicated hardware, or may be realized as programs including code instructions executed on data processing units, it is further possible that parts of the above sequence of operations are carried out in hardware, whereas other of the above processing operations are carried out using software.

The underlying technology allows for replication to various other sites. Each new site can maintain "state" with its neighbors so that in the event of a catastrophic failure, other server systems can continue to keep the application running, and allow the system to load-balance the application geographically as required.

Further, although aspects of one implementation of the present invention are described as being stored in memory, one of ordinary skill in the art will appreciate that all or part of the methods and systems consistent with the present invention may be stored on or read from other computer-readable media, such as secondary storage devices, like hard disks, floppy disks, CD-ROM, a carrier wave received from a network such as the Internet, or other forms of ROM or RAM either currently known or later developed. Further, although specific components of the system have been described, one skilled in the art will appreciate that the system suitable for use with the methods and systems consistent with the present invention, may contain additional or different components.

Subscription Application

In one embodiment consistent with the present invention, a server 120 at a publisher's service (or at a client 101), compiles a predetermined list of items, such as regulatory, contract, budgeting, and legal issues, either manually or automatically, according to a subscription list from a variety of users. In manual operation, a user at the publisher's service, inputs items that are obtained via a variety of means (i.e., e-mails with attachments, published documents, etc.), and the program 125 will store the inputted information on the items into the storage device 128.

In one embodiment, in the automatic operation, the server 120 receives automatic uploads from various organizations which send out their latest regulations, legislation, etc., to a list of subscribers. The program 125 will store the uploaded information on items in the storage device 128.

The inputted information stored in the storage device 128, no matter how obtained (i.e., manually or automatically), in one embodiment, is organized into channels by the program 125. Each channel contains a specific kind of data that the program 125 has packaged together—similar to a radio station that offers jazz, or rock, or classical music. Within a channel, individual data records are stored as items. Each item represents a single piece of data within the channel, like a radio station would play an individual song or broadcast an individual news item. An item may be associated with more than one channel.

The user at a client 101, would subscribe to the publisher's service, and more specifically, to the channels, based on their interests. Additionally, each user can subscribe to one or more channels.

In one embodiment, the client 101 would subscribe to the publisher's service, to receive information on a predetermined set of items. Thus, the program 125 would have a predetermined set of instructions to forward uploads to predetermined channels to the client 101. Accordingly, periodically, the program 125 will scan its database 128, and according to the channels preselected by the user at client 101 in their subscription, the program 125 will retrieve these selected items associated with a particular channel, and forward them to the client 101.

In another embodiment consistent with the present invention, the program 125 can forward a plurality of items based on a plurality of channels chosen by a plurality of users at a single client 101.

In one embodiment, the client program 110 may instruct the server 120 to forward an e-mail to the client 101 on a periodic basis (i.e., daily, weekly, monthly), whenever new items are added to the channels on the client 101 subscription list. The channel, topics, jurisdictions (discussed below), and frequency of being informed of the new items may all be selected by the user and programmed into the memory 124. The program 125 can combine all of these preferences into a single e-mail to the client 101 that contains all of the new items that meet this criteria.

Note that, in one embodiment, although only new items are forwarded, an initial upload may be performed from the server 120 to the client 101 based on the preselected channels.

Accordingly, in one embodiment consistent with the present invention, the user may activate a link in an e-mail notification from the program 125 that updated items are present in the database 128, or the user may access the client 101 and check the subscription application to determine if updated items are present in the database 128.

In another embodiment consistent with the present invention, both the client 101 and the server 120 are part of the same system.

When the user accesses the subscription feature at the client 101, the items are displayed by the program 110 in a format that is easily viewable and searchable. The user may choose a particular item to review, and then, if the user determines the item to be a relevant one to the user's company, the user may transfer the item information to a monitoring software application for future monitoring and/ or internal implementation of the issue. The subscription application works with the issue tracking application of pending U.S. patent application Ser. No. 11/245,240, filed Oct. 7, 2005, the contents of which are herein incorporated by reference in its entirety.

Details of Subscription Application

In one embodiment, at the client 101, the user would log into the subscription application, by either entering in a predetermined web address into a web browser window, or by following a web link contained in an e-mail notification. The user would then select the Subscription menu option displayed by the program 110, and the program 110 would display an Item List Page 300 (see FIG. 2). Alternatively, the program 110 may display the Item List page as a default, if the user selects this option. The program 110 displays only those Items in the Item List, to which the user subscribes. However, the display of Items may be different depending on the user. For example, authorized users at the company would see all Items to which the company subscribes.

The Item List Page includes a Filter option 301, and also an Items list 302, for example, which shows the number of Items in the list, and also provides a numerical count of the number of Items.

Taking the Items list first, the program 110 shows the Items by Headline, for example, which provides the title of each Item. An ● icon precedes the headline, for example, and when the user places the cursor of the input means 104 over this icon, the program 110 will display a box below the Headline, providing more information or details about the Item.

In one embodiment, also preceding the Headline on the Item List Page, are a Checkbox icon ☐ for the selection of Items, a Paperclip icon ✆ for showing Attachments, and a Checkmark icon ✓, which can show either a Checkmark ✓, that an Item is resolved, an Up arrow ↺ to show that the Item is of Interest, and a Down arrow ↻ to show that the Item is Not of Interest. If the Checkmark area is blank, then the Item has not been dispositioned by the user. Attachments (if any) are displayed by the program 110 when the ✆ icon is accessed by the user, for example.

In addition, a "U" icon, for example, next to the Headline shows that this Item is an update to the previous Item displayed by the program 110. Previous versions of the Item can be displayed by the program 110 by clicking on the Item, for example, to open the Item.

In addition to the Headline, for example, the Jurisdictions that the Items are related to, as determined by the publisher, are also displayed by the program 110, as well as a Publish date, when the Item was published. The Jurisdictions header displays the areas of governance (i.e., geographic areas) defined by the publisher, such as particular states, territories, or regions.

In one embodiment, the Item List may be sorted and filtered by the program 110. The Item List can be sorted by the user clicking on a sortable column header, for example. When the ▫ icon appears when the user moves the input means 104 over a sortable column header, for example, the program 110 displays an icon which indicates a column header that is sortable. Sortable column headers are underlined on the display page by the program 110, and include the headers Jurisdiction and Publish date, for example. The ◪ icon indicates the sort order and the current sort column, for example. The first time the user clicks a sort column, the information is sorted by the program 110 in ascending order. The second time the user clicks a sort column, the information is sorted in descending order by the program 110. Jurisdiction is sorted according to the first Jurisdiction it is assigned alphabetically, for example, then the other Jurisdictions.

The user may page through the Items if desired. The number of pages of the Items List is displayed by the program 110 on the screen, at the top and bottom of the grid, for example. The user simply enters a page number in the page number box, and the program 110 will display the selected page. The user may display the First Item, Previous Item, Next Item, and Last Item.

Figure 3:
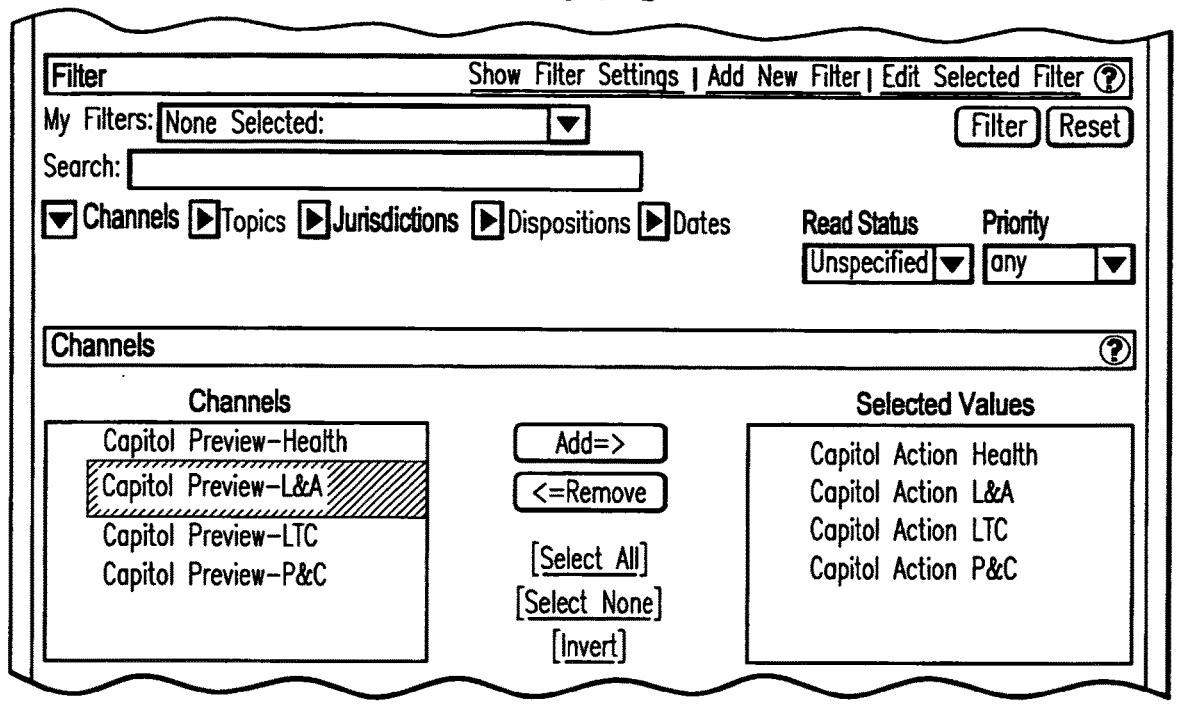
FIG. 3 is a representative screen shot of filtering, in this case, Channels, according to one embodiment consistent with the present invention.
Figure 4:
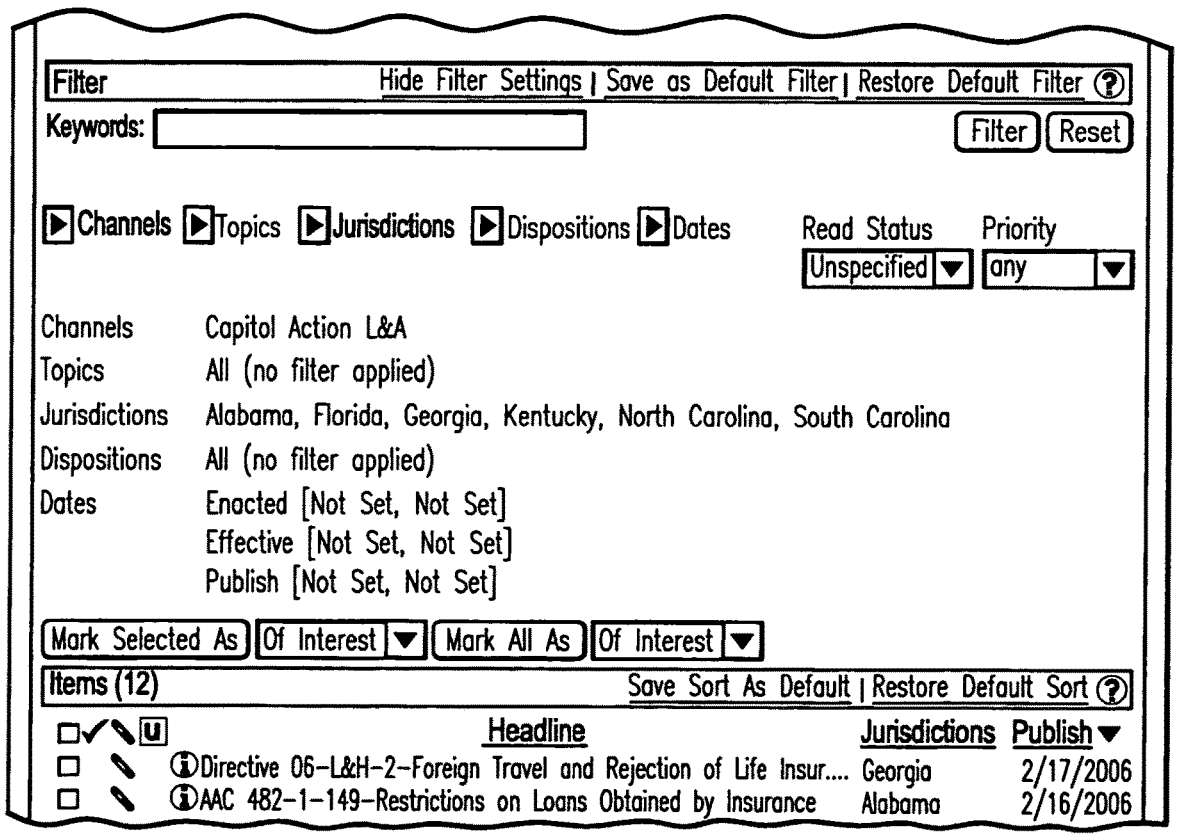
FIG. 4 is a representative partial screen shot of a filter screen according to one embodiment consistent with the present invention.

In one embodiment, the Items List can also be filtered by the program 110 to display only those Items which meet certain criteria—i.e., Items of Interest, channel (see FIG. 3), Topic, Jurisdictions, dispositions, and dates (see FIG. 4). For example, to display only those Items "Of Interest" in the disposition pull-down, the user would select the Filter button and the program 110 will reload the Items list with only those Items that meet the Filter criteria.

For example, the Filter options may include, but are not limited to, Keywords, Channel, Topic, Jurisdiction(s), Date, Read Status, Disposition, and Priority. Accessing keywords instruct the program 110 to search the Headline, Citation, and Description fields, for example, the keywords which can be highlighted by the program 110. Citations include statutes, bills, bulletins, regulations or other cited authorities containing the compliance information to be processed. Description is a detailed description of the item as provided by the publisher.

The user may filter the Items such that only the user-selected Channels are displayed by the program 110.

The Topic is associated with the Item, and is a classification assigned by the publisher based on the content of the Item.

The Date is the enactment date, or effective date, or publish date of the Item, for example. The start and end dates for any of these criteria can be user-selected for filtering.

The Read status allows the program 110 to filter the Items that are read, unread, or unspecified as to read/unread Items, for example.

Disposition is the filtering of Items based on whether the user has assigned the items, including any "Of Interest", "Not of Interest", or "Resolved" Items, for example.

Priority can be assigned as Any, Low, Normal and High, by the user, and can be filtered by the program 110, for example.

In one embodiment, to filter by Channel, Topic, Jurisdiction, Disposition, Date, the user would simply click the arrow next to the label and the program 110 will display an Add/Remove box (see FIG. 3), for example, allowing the user to select one or more values to filter on. In addition, the user may select to filter by Read Status or Priority, for example. When a filter is applied, only the Items that match all of the Filter criteria are displayed by the program 110. If an Item matches one of the criteria but not another, it will not be displayed by the program 110. For example, if the user selects a particular Jurisdiction and a specific Topic, then only those Items that meet both the Jurisdiction and the Topic criteria are displayed by the program 110.

With respect to filtering by dates, as specified above, the user may enter a start and end date, for example. To enter a relative date, the user would input the word "today" and add a "+" or "−" the number of days as requested. For example, if the user always wants to show only those Items that were published in the last ten days, the user would enter the start date as "today−10", and the end date as "today", and the program 110 will display Items only in accordance with the selected dates.

Once the Filter is run by the program 110, the user may select Show Filter Settings and the program 110 will display the filter settings. The program 110 will also store the filter settings and show the filtered settings each time the user displays the filter list, for example. To hide the filter settings, the user simply clicks on the Hide Filter Settings link.

In one embodiment, the user may save any number of filters and save them for future use. The user would simply click the Add New Filter link and the program 110 will display a filter name box in the filter area, for example, allowing the user to name the filter. The user may then adjust the filter settings as desired, and simply click the Filter button to see the results of the filter. When the filter settings are as desired, the user may simply click the Save button and the filter will be saved by the program 110. The user may apply this Filter and any Filter that has been saved by selecting it in the My Filters pull-down box in the Filter area, for example. The saved Filters may become the default filter if selected by the user, and the program 110 will always show that filter when the user selects the Filter list.

In one embodiment, the user may also save sort preferences by selecting the Save Sort As Default link in the Sort area. Selecting this link will save the current sort options so that the program 110 may restore them at a later time by selecting the Restore Default Sort link, for example. The program 110 will remember the sort preferences and restore them each time the user logs in, for example.

In one embodiment, to reset the Filter to its default options, the user can select the Reset button, which will cause the program 110 to reset the Filter options to their unset values so that other Filter criteria can be entered, or the default list can be displayed by the program 100.

In one embodiment, each Item may be viewed and edited by clicking the Item Headline, and the program 110 will display the Item Page with the Item Details Tab, for example (see FIG. 5). The Details tab displays information which may include the Headline, Status (i.e., Disposition, Priority), Citation, Important Dates (i.e., enacted date, effective date, publish date), Description, and Classification Data (i.e., Jurisdiction, Topics, Channels, Publisher), for example.

The program 110 will show the user's disposition of each Item, and may show the other user's dispositions for each Item, by hovering the input means 104 over the icon next to the Disposition label, for example. The Priority label functions similarly.

The Citations, Description, Jurisdictions, Topics, Channels, and Publisher are as described above. The Enacted Date is the enacted/adopted/release date of the new legislation/regulation/bulletin etc. The Effective Date is the date the law/regulation/communication takes effect. The Publish Date is the date the Item was published by the publisher.

In one embodiment, other tabs which can be accessed by the user are: Attachment(s) (including the number of attachments shown in the tab), Note(s) (including the number of attachments shown in the tab), Item History (including the number of items shown in the tab), and Related Issue(s) (including the number of Issues shown in the tab), for example.

In addition, options provided by the program 110 for the user include: Save Changes (to the Item), Save and Return (returns to the Item List), Return to Item List (without saving changes), Disposition this Item, Add a Note, Create an Issue from this Item (i.e., displays the Create Issue Page from related pending U.S. patent application Ser. No. 11/245, 240), Highlight (keywords), and Print, for example.

The Attachments tab includes links to documents (i.e., word processing documents, scanned documents, spreadsheets, etc.), or links to Internet web pages, for example (see FIG. 6). The Attachments section allows the user to obtain more information that will assist in understanding the Item.

The Attachments can vary from zero to any number, and are only limited by the storage capacity of the system 101. When the Attachments tab is clicked on, the Attachments screen shows the Attachment Name (the publisher-defined name of an electronic document or web link attached to the Item for the purpose of clarification, and background information and/or full text of the cited reference), File Name (actual file name or Internet address of the Attachment), File Type (i.e., type of Attachment, including but not limited to, word processing document, spreadsheet, image, scanned document, text document, and URL), and the Size of the Attachment (see FIG. 6), for example.

In one embodiment, the Notes tab includes a display of a list of all Item-related Notes, as displayed by the program 110 (see FIG. 7). Notes can be used to communicate further information about an Item or to make comments about the Item. A user adds a Note by simply clicking the Add a Note link in the "I Want To" section of the page, and the Note is added similarly as described in related pending U.S. patent application Ser. No. 11/245,240.

The Notes section fields include Added (i.e., date the Note was added to the Item), Author (individual who added the Note), Note (text), and Edit/Delete, for example. The user may make modifications to their Note by clicking the Edit button, or may delete their Note by clicking the Delete link, the program 110 will remove the link. The user may not make edits to other users' Notes—these Notes may only be viewed.

In one embodiment, if the Item has been updated, the Item History tab (see FIG. 8) will show all previous versions of the Item. The user may view the previous version(s) by selecting them from the previous versions table, and the program 110 will show the previous Headlines, Effective date and Publish date, along with any Attachments etc., for example.

In one embodiment, the Related Issues tab (see FIG. 9) shows any Issues that have been created from the selected Item. This tab only appears if the tracking feature for tracking Issues is enabled (as described in related pending U.S. patent application Ser. No. 11/245,240. The Related Issues Tab includes The Issue (number), Category (as defined by the user), Compliance (date), Created date, and Issue Owner, for example.

Once the user has reviewed an Item, the user may disposition the Item to indicate if it is Of Interest, Not of Interest, or Resolved, for example. In one embodiment, to disposition a single Item, the user may click on the Disposition this Item link in the "I Want To" section of the Item Page, for example, and the program 110 will open the Item (see FIG. 10). The user may then select the appropriate disposition, and then click Save Changes for the program 110 to save the disposition.

In one embodiment, if the user wishes to disposition several Items at once, the program 110 provides two options for performing this task. In one option, the user may check multiple items on the Item List, by checking the checkbox next to each Item, and mark them all with the same disposition. The Mark Selected As button will show the various dispositions for the user to mark the disposition. The user simply clicks the Mark Selected As button for the program 110 to apply the disposition to the selected Item.

In a second embodiment, to disposition several Items that do not appear on the same page, the user may mark all of the Items that match their filter criteria with the same disposition. For example, if the user wishes to mark all items in New Jersey as Of Interest, the user would simply set the filter to only show the Items with Jurisdiction of New Jersey, then set the pull down menu next to the Mark All As button to the appropriate disposition, then click Mark All As. The program 110 will then apply the disposition to the selected Items.

In one embodiment, if the user wishes to create an Issue from an Item, the user may select the Create an Issue from this Item link on the Item Page. The program 110 will then display a Create Issue Page (see FIG. 11) from which the program 110 can map the publisher's Jurisdictions to the Jurisdictions that the user has defined for tracking in the Issue monitoring and tracking device of pending U.S. patent application Ser. No. 11/245,240. The user may select an existing Jurisdiction within the user's existing group to map to, or can instruct the program 110 to create a new jurisdiction within the user's group and the program 110 will add it, for example.

In particular, the user can select the Map Item Jurisdiction to Issue Jurisdiction, for example, and the program 110 will display a box with the present Jurisdiction, the Mapped To Jurisdiction which can be chosen from a pull-down menu, and the Remember checkbox, which can be checked for the program 110 to save the settings. The program 110 will remember the mapping that the user created and automatically choose the mapping the next time that the user converts and Item to an Issue with that jurisdiction.

In addition, in one embodiment, the program 110 allows Topics to be mapped, by the program 110 displaying a Map Item Topics to Issue Categories, where the present Topic can be Mapped to Category chosen form a pull-down menu, and the Remember checkbox may be checked so that the program 110 can save the settings.

As described in pending U.S. patent application Ser. No. 11/245,240, the Issue created may be a standard Issue or an FYI Issue. The priority, enactment date, effective date, source (publisher), Citation, Overview (of Issue), Issue Details, Topics, Jurisdictions, Topics, and Attachments, are all displayed, for example.

Figure 13:
FIG. 13 is a representative screen shot of an E-mail Notification Administration page according to one embodiment consistent with the present invention.

As noted above, the program 110 sends a number of e-mail notifications (see FIG. 12) to the user notifying them when a new Item has been added to the Item list. The user can specify the channel, Topics, Jurisdictions, and frequency that the user wishes to be informed about the new Items (see FIG. 13). The program 110 will combine all of the preferences into a single e-mail that contains all of the new Items that meet the user's criteria.

When the e-mail notification is sent by the program 110, and then displayed for the user (see FIG. 12), it shows Account Information (i.e., e-mail address, group name, account login, for example), e-mail frequency (i.e., daily, weekly, monthly), Summary Document Updates (i.e., a table of contents of all new items summarized in the e-mail), and an Item Summary of each Item.

The e-mail notification criteria may be edited by the user (see FIG. 14), in order to delete the e-mail notification, change the frequency of receipt of the e-mails, select the channels the user wishes to be notified about, select the Topics within the channel which the user wishes to be notified about (or none, if all are included), and select the Jurisdictions within the channel that the user wishes to be notified about, for example. The edits are stored by the program 110 and the next e-mail notification will adhere to these parameters. If no new Items meet the user-selected criteria, the program 110 will not send an e-mail for that period.

Operational Example

In one operational example consistent with the present invention, a user would subscribe to a publisher's service, or specify in a subscription portion of their subscription system 101, 120, at least one channel for the receipt of Items. The subscription service program 125 would receive this subscription list from the user in step 400 (see FIG. 1 SA), and compile the information in database 128 in channels in step 401. Thereafter, at periodic intervals, the program 125 would scan for updated Items in the database 128 in step 402. The program 125 would then query in step 403, if there are any updated Items since the last download to the client 101.

If there are no updated Items, no e-mail notification is sent to the client 101, and step 402 is repeated at the next predetermined timeframe. If there are updated Items since the last download to the client 101 in step 404, the program 125 would forward an e-mail notification to the client 101 in step 404, including a list of the Items from the channels subscribed to by the user.

At the client 101, the user would log into the subscription application, by following a web link contained in the e-mail notification received in step 405, or simply log into the subscription application itself. The user would then select the Subscription menu option displayed by the program 110, and the program 110 would display the Item List Page in step 406.

Note that if the user wishes, the e-mail notification criteria may be edited to change its frequency, for example, in step 407. In that case, the next e-mail notification of step 404, will be in accordance with the edited parameters.

The user may then sort the Item list in accordance with their preferences, and the program 110 will display the Items in accordance with the sort preferences in step 408.

Further, if the user wishes to view the Items in a particular Jurisdiction, for example, the user may utilize the Filter feature, and the program 110 will display the Items in step 409, according to the applied Filter.

The user may then click on a particular Headline, and the program 110 would display Details of the Item to the user in step 411.

Figure 15A:
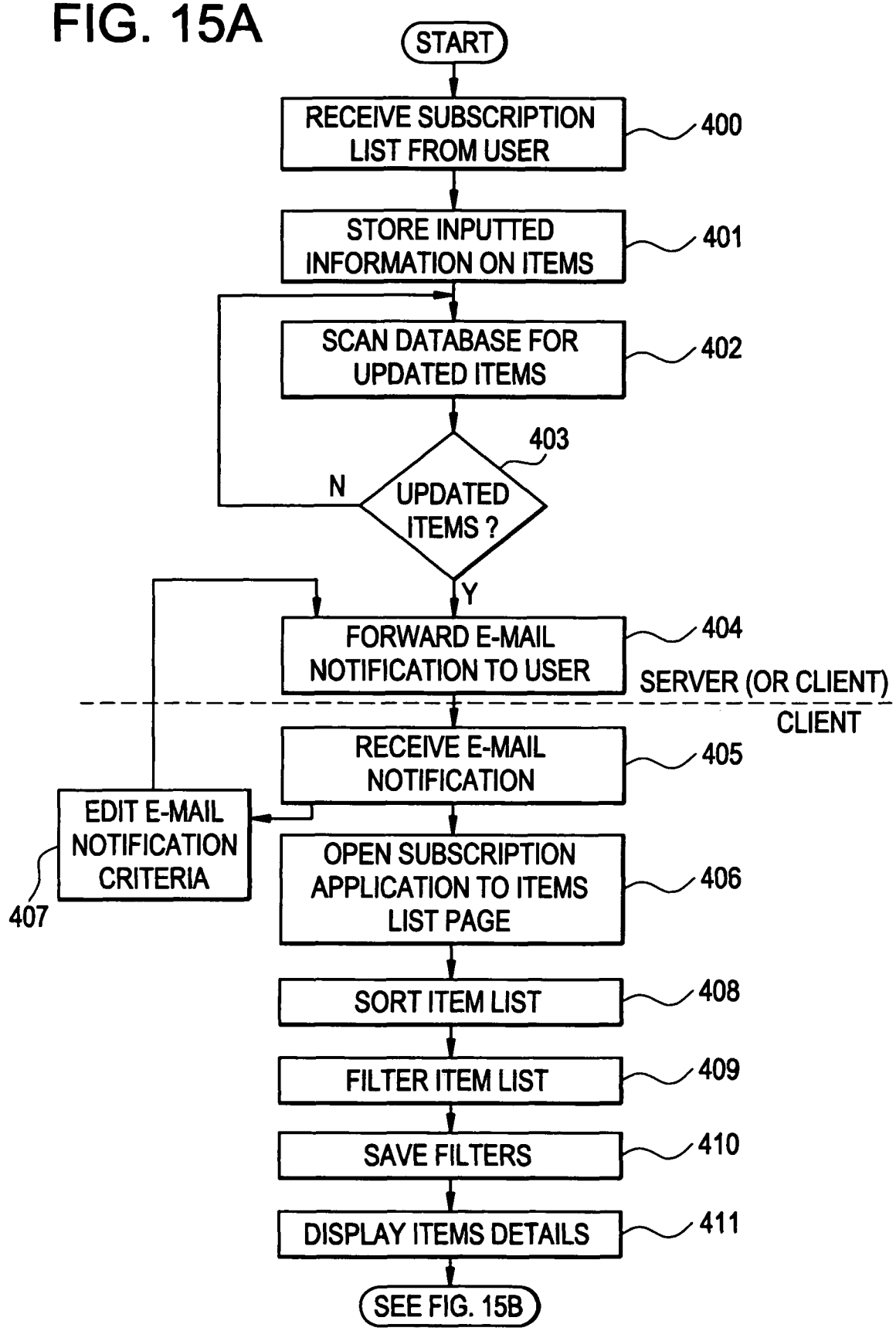

The user may also click on the Attachments tab, and the program 110 will display any Attachments in step 412 (see FIG. 15B).

The user may also add a Note, which can be saved in step 413 by the program 110.

The program 110 may also display the Item History and Related Issues, in steps 414 and 415, in accordance with the user commands.

Finally, when the user has reviewed the Item and all its related information, the user may disposition the Item as "Of Interest" or "Not of Interest", for example, in step 416.

If the user wishes, an Item may be selected for further monitoring and tracking as an Issue, and the program 110 will display the Create Issue page in step 417. Items such as Jurisdiction, may be mapped to the Issue page in step 418, and the monitoring and tracking of the Issue will continue in step 419 in another tracking and monitoring application, as described in related pending U.S. patent application Ser. No. 11/245,240.

The user may then close the subscription application until the next e-mail notification.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A system comprising:
a database storing content received from a plurality of third party organizations, wherein the content comprises a plurality of individual data records including law related to an industry of one or more subscribers and regulations related to an industry of the one or more subscribers;
one or more processors to:
receive the content from the plurality of third party organizations;
store the content as individual data records at the database; and
organize the database into one or more channels, wherein the one or more channels are constructed based on a set of channel rules that group a subset of the individual data records into a channel based at least on a relation of the individual data records to a defined industry, and wherein the set of channel rules group one or more of the individual data records into more than one channel of the one or more channels based on the relation of the individual data records to more than one defined industry;
an interactive graphical user interface executable by the one or more processors to:
provide access to the content stored in the database for the one or more subscribers, wherein providing access to the content includes:
presenting at least a portion of the individual data records to a subscriber according to a set of subscription rules that limit at least the portion of the individual data records presented to individual data records that are organized into one or more channels identified based on subscription preferences of the subscriber, wherein at least the portion of the individual data records presented at the interactive graphical user interface is a reduced set of the individual data records stored at the database that omits one or more individual data records based on subscription preferences of the subscriber;
receive disposition designations from the one or more subscribers, wherein each of the disposition designations relate to at least one item of content stored in the database, wherein the disposition designations are received by:
receiving a first input from a user identifying a first individual data record of the individual data records as being of interest,
receiving a second input from the user identifying a second individual data record of the individual data records as being not of interest, and
receiving a third input from the user identifying a third individual data record of the individual data records as being resolved;
transfer information associated with disposition designations to an issue tracking and monitoring application operatively connected to the interactive graphical user interface in response to input of the disposition designations by the one or more subscribers;
present an interactive mapping element that receives user inputs that map a first jurisdiction to a second jurisdiction, wherein the first jurisdiction is associated with an item of content stored in the database and the second jurisdiction is associated with an issue designated for tracking by the issue tracking and monitoring application;
present a remember mappings element within the graphical user interface, the remember mappings element that saves mapping data generated by the user, wherein the saved mapping data maps other items of content to the second jurisdiction during a subsequent access of the graphical user interface by the user,
wherein the issue tracking and monitoring application is executable by the one or more processors to:
receive the information associated with the disposition designations;
generate a mapping of content stored in the database to one or more jurisdictions based on the information associated with the disposition designations and the user inputs;
monitor the content stored in the database to detect changes to the content associated with the mapping data;
generate one or more notifications to the one or more subscribers based on detected changes to the content associated with the mapping; and
transmit the one or more notifications to the one or more subscribers via one or more networks.

2. The system of claim 1, wherein the detected changes to the content associated with the mapping comprise at least one change selected from the group consisting of: addition of new content related to the content stored in the database, modification of the content stored in the database, a priority of the content stored in the database, an enactment date associated with content stored in the database, an effective date associated with the content stored in the database, a source of the content stored in the database, and a citation associated with the content stored in the database.

3. The system of claim 1, wherein the one or more processors are configured to organize the content stored at the database into one or more channels, and wherein the interactive graphical user interface is configured to receive user subscription preferences from each of the one or more subscribers, wherein, for each of the one or more subscribers, the user subscription preferences identify one or more channels to which a user subscribes.

4. The system of claim 3, wherein the one or more channels are constructed based on a set of channel rules that group a subset of the individual data records into a channel based at least on a relation of the individual data records to a defined industry.

5. The system of claim 4, wherein the set of channel rules group one or more of the individual data records into more than one channel of the one or more channels based on a relation of the individual data records to more than one defined industry.

6. The system of claim 3, wherein, for each of the one or more subscribers, the user subscription preferences identify user selected filters, and wherein the interactive graphical user interface controls access to the one or more channels to which a particular user has subscribed based on a set of channels to which the particular user has subscribed and subscription preferences of the particular user.

7. The system of claim 6, wherein one or more individual data records are omitted from the presented at least the portion of the individual data records according to a set of filtering rules based on filters indicated in the subscription preferences of the particular user.

8. The system of claim 7, wherein the filtering rules are based on at least one criterion selected from the list consisting of: keywords, a channel, a topic, jurisdictions, date, read status, disposition, and priority.

9. The system of claim 7, wherein the filtering rules are based on at least one criterion selected from the list consisting of: information that identifies content of interest, a subscribed channel, a topic, one or more identified jurisdictions, one or more dispositions, and one or more dates.

10. The system of claim 1, wherein the interactive graphical user interface displays information associated with at least one item of content stored at the database, the information associate with the at least one item of content comprising data selected from the list consisting of: details of one or more individual data records corresponding to the at least one item of content, a list of attachments associated with the at least one item of content, notes, history information associated with the at least one item of content, and information associated with issues related to the at least one item of content.

11. The system of claim 1, wherein the issue tracking and monitoring application detects the changes to the content associated with the mapping based at least in part on a scan of the content stored at the database.

12. The system of claim 11, where the issue tracking and monitoring application initiates the scan of the content stored at the database periodically.

13. The system of claim 12, wherein the scan is initiated periodically based on a predetermined time interval.

14. The system of claim 12, wherein the scan is analyzes individual data records to detect changes to the content stored in the database relative to a state of the individual data records determined during a previous scan of the content stored in the database.

15. A method comprising:
  receiving, by one or more processors, content from a plurality of third party organizations;
  storing, by the one or more processors, the content at a database, wherein the content comprises a plurality of individual data records including law related to an industry of one or more subscribers and regulations related to an industry of the one or more subscribers;
  providing, by an interactive graphical user interface, access to the content stored in the database for the one or more subscribers, wherein providing access to the content comprises:
    presenting at least a portion of the individual data records to a subscriber according to a set of subscription rules that limit at least the portion of individual data records to individual data records that are organized into one or more channels identified based on subscription preferences of the subscriber, wherein at least the portion of the individual data records presented at the interactive graphical user interface is a reduced set of the individual data records stored at the database that omits one or more individual data records based on subscription preferences of the subscriber;
  receiving, by the interactive graphical user interface, disposition designations from the one or more subscribers, wherein each of the disposition designations relate to at least one item of content stored in the database, wherein the disposition designations are received by:
    receiving a first input from a user identifying a first individual data record of the individual data records as being of interest,
    receiving a second input from the user identifying a second individual data record of the individual data records as being not of interest, and
    receiving a third input from the user identifying a third individual data record of the individual data records as being resolved;
  transferring, by the interactive graphical user interface, information associated with disposition designations to an issue tracking and monitoring application operatively connected to the interactive graphical user interface in response to input of the disposition designations by the one or more subscribers;
  presenting, by the interactive graphical user interface, an interactive mapping element that receives user inputs that map a first jurisdiction to a second jurisdiction, wherein the first jurisdiction is associated with an item of content stored in the database and the second jurisdiction is associated with an issue designated for tracking by the issue tracking and monitoring application;
  presenting, by the interactive graphical user interface, a remember mappings element within the graphical user interface, wherein the remember mappings element saves mapping data generated by the user, wherein the saved mapping data maps other items of content to the second jurisdiction during a subsequent access of the graphical user interface by the user;
  receiving, by the issue tracking and monitoring application, the information associated with the disposition designations;
  generating, by the issue tracking and monitoring application, a mapping of content stored in the database to one or more jurisdictions based on the information associated with the disposition designations;
  monitoring, by the issue tracking and monitoring application, the content stored in the database to detect changes to the content associated with the mapping data;
  generating, by the issue tracking and monitoring application, one or more notifications to the one or more subscribers based on detected changes to the content associated with the mapping; and
  transmitting, by the issue tracking and monitoring application, the one or more notifications to the one or more subscribers via one or more networks.

16. The method of claim 15, wherein the detected changes to the content associated with the mapping comprise at least one change selected from the group consisting of: addition of new content related to the content stored in the database, modification of the content stored in the database, a priority of the content stored in the database, an enactment date associated with content stored in the database, an effective date associated with the content stored in the database, a source of the content stored in the database, and a citation associated with the content stored in the database.

17. The method of claim 15, further comprising:
  organizing the content stored at the database into one or more channels; and
  receiving, by the interactive graphical user interface, user subscription preferences from each of the one or more subscribers, wherein, for each of the one or more subscribers, the user subscription preferences identifying one or more channels to which a user subscribes.

18. The method of claim 17, wherein, for each of the one or more subscribers, the user subscription preferences identify user selected filters, and wherein the method comprises controlling, by the interactive graphical user interface, access to the one or more channels to which a particular user has subscribed based on a set of channels to which the particular user has subscribed and subscription preferences of the particular user.

19. The method of claim 18, wherein one or more individual data records are omitted from the presented at least the portion of the individual data records according to a set of filtering rules based on filters indicated in the subscription preferences of the particular user.

20. The method of claim 15, further comprising:
periodically initiating, by the issue tracking and monitoring application, a scan of the content stored at the database periodically; and
analyzing, during the scan by the issue tracking and monitoring application, individual data records to detect changes to the content stored in the database relative to a state of the individual data records determined during a previous scan of the content stored in the database.

21. A subscription method performed over a computerized network, comprising the steps of:
receiving, at a publisher's content server, automatic uploads of content from a plurality of third party organizations, wherein the content comprises a plurality of individual data records including law related to an industry of one or more subscribers and regulations related to an industry of the one or more subscribers;
storing the content in a database as individual data records;
organizing, by a program, the database into one or more channels, wherein the one or more channels are constructed based on a set of channel rules that group a subset of the individual data records into a channel based at least on the individual data records' relation to a defined industry, and wherein the set of channel rules group one or more of the individual data records into more than one channel of the one or more channels based on the individual data records' relation to more than one defined industry;
receiving user subscription preferences of a user, wherein the user subscription preferences identify one or more channels to which the user subscribes and identify user selected filters;
generating a graphical user interface (GUI) for the user and including within the GUI access to the one or more channels to which the user has subscribed, the GUI at least provides:
(a) listing at least a portion of the individual data records according to a set of subscription rules that limit the listing to individual data records that are organized into the one or more channels that the user subscription preferences identify as being a channel to which the user subscribes,
(b) reducing the amount of individual data records in the listing by omitting one or more individual data records from the listing according to a set of filtering rules based on the user selected filters of the user subscription preferences, and
(c) accepting input from the user identifying disposition designations from at least some of the user subscribers, wherein each of the disposition designations relate to at least one item of content stored in the database, wherein identifying the disposition designations comprises:
(1) receiving a first input from the user identifying a first individual data record of the listed individual data records as being of interest,
(2) receiving a second input from the user identifying a second individual data record of the listed individual data records as being not of interest, and
(3) receiving a third input from the user identifying a third individual data record of the listed individual data records as being resolved;
transferring information associated with disposition designations to an issue tracking and monitoring software application operatively connected to the GUI in response to input from the disposition designations by one of the at least some of the subscribers;
changing the GUI at least in response to the disposition of individual data records;
presenting an interactive mapping element that receives user inputs that map a first jurisdiction to a second jurisdiction, wherein the first jurisdiction is associated with an item of content stored in the database and the second jurisdiction is associated with an issue designated for tracking by the issue tracking an monitoring application;
presenting a remember mappings element within the graphical user interface, the remember mappings element saves mapping data generated by the user, wherein the saved mapping data maps other items of content to the second jurisdiction during a subsequent access of the graphical user interface by the user,
wherein the issue tracking and monitoring application is executed by one or more processors to:
receive the information associated with the disposition designations;
generate a mapping of content stored in the database to one or more jurisdictions based on the information associated with the disposition designations and the saved mapping data;
monitor the content stored in the database to detect changes to the content associated with the mapping data;
generate one or more notifications to the one of the at least some of the subscribers based on detected changes to the content associated with the mappings data; and
transmit the one or more notifications to the one of the at least some of the subscribers via one or more networks.

22. The method according to claim 21, further comprising the step of scanning the channels of the database for said individual data records which has been updated since a previous scan of the database.

23. The method according to claim 22, wherein the listing only presents updated individual data records in the GUI.

24. The method according to claim 23, further comprising:
scanning the channels of the database periodically for updated items since a last scan of channels of the database, wherein said scanning step is performed at predetermined intervals.

25. The method according to claim 21, wherein said GUI is sent by e-mail notification to the user.

26. The method according to claim 21, wherein said filtering rules are based at least on one of: the identified items of interest, a subscribed channel, a topic, jurisdictions, dispositions, and dates.

27. The method according to claim 21, wherein said filtering rules are based on at least one of: keywords, a channel, a topic, jurisdictions, date, read status, disposition, and priority.

28. The method according to claim 21, wherein said GUI displays at least one of:
   details of each of the listed individual data records, a list of attachments, notes, item history, and related issues.

* * * * *

UNITED STATES PATENT AND TRADEMARK OFFICE
CERTIFICATE OF CORRECTION

| | |
|---|---|
| PATENT NO. | : 10,825,029 B2 |
| APPLICATION NO. | : 11/517336 |
| DATED | : November 3, 2020 |
| INVENTOR(S) | : William R. Oden et al. |

It is certified that error appears in the above-identified patent and that said Letters Patent is hereby corrected as shown below:

In the Specification

At Column 13, Line number 32, delete "program 100" and replace with --program 110--.
At Column 16, Line number 8, delete "FIG. 1 SA" and replace with --FIG. 15A--.

In the Claims

At Column 19, Claim number 14, Line number 33, delete "wherein the scan is analyzes" and replace with --wherein the scan analyzes--.

Signed and Sealed this
Twelfth Day of January, 2021

Andrei Iancu
*Director of the United States Patent and Trademark Office*